(12) United States Patent
Liebau et al.

(10) Patent No.: US 12,291,098 B2
(45) Date of Patent: May 6, 2025

(54) METHOD AND DEVICE FOR PROVIDING INFORMATION IN A VEHICLE

(71) Applicant: Bayerische Motoren Werke Aktiengesellschaft, Munich (DE)

(72) Inventors: Claudia Liebau, Landshut (DE); Daniel Liebau, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 213 days.

(21) Appl. No.: 18/021,216

(22) PCT Filed: Aug. 30, 2021

(86) PCT No.: PCT/EP2021/073848
§ 371 (c)(1),
(2) Date: Feb. 14, 2023

(87) PCT Pub. No.: WO2022/058143
PCT Pub. Date: Mar. 24, 2022

(65) Prior Publication Data
US 2023/0322080 A1 Oct. 12, 2023

(30) Foreign Application Priority Data
Sep. 15, 2020 (DE) ............ 10 2020 124 005.4

(51) Int. Cl.
*B60K 35/00* (2024.01)
*G06V 20/58* (2022.01)
(Continued)

(52) U.S. Cl.
CPC ............. *B60K 35/00* (2013.01); *G06V 20/58* (2022.01); *G06V 20/59* (2022.01); *B60K 35/22* (2024.01);
(Continued)

(58) Field of Classification Search
CPC ........ B60K 35/00; B60K 35/22; B60K 35/28; B60K 2360/176; B60K 2360/177;
(Continued)

(56) References Cited

U.S. PATENT DOCUMENTS

| 6,727,807 B2 | 4/2004 | Trajkovic et al. |
| 7,982,620 B2 | 7/2011 | Prokhorov et al. |

(Continued)

FOREIGN PATENT DOCUMENTS

| DE | 10 2011 114 810 A1 | 5/2012 |
| DE | 10 2011 118 157 A1 | 5/2013 |

(Continued)

OTHER PUBLICATIONS

International Search Report (PCT/ISA/210) issued in PCT Application No. PCT/EP2021/073848 dated Nov. 25, 2021 with English translation (six (6) pages).

(Continued)

*Primary Examiner* — Mary Cheung
(74) *Attorney, Agent, or Firm* — Crowell & Moring LLP

(57) ABSTRACT

A device for providing information in a vehicle is provided. The device is configured to determine person-related data with respect to an occupant of another vehicle in a surroundings of the vehicle and/or vehicle-related data with respect to the other vehicle. Moreover, the device is configured to output the person-related data and/or the vehicle-related data to an occupant of the vehicle.

9 Claims, 2 Drawing Sheets

(51) Int. Cl.
*G06V 20/59* (2022.01)
*B60K 35/22* (2024.01)
*B60K 35/28* (2024.01)

(52) U.S. Cl.
CPC ........ *B60K 35/28* (2024.01); *B60K 2360/176* (2024.01); *B60K 2360/177* (2024.01); *B60K 2360/21* (2024.01)

(58) Field of Classification Search
CPC .... B60K 2360/21; G06V 20/58; G06V 20/59; G06Q 50/40; G06Q 30/0265; G06Q 50/01; G02B 2027/0138; G02B 2027/014; G02B 2027/0183; G02B 27/01; G08G 1/0962; G08G 1/096716; G08G 1/096775; G08G 1/096791; G08G 1/096741; H04W 4/46
See application file for complete search history.

(56) References Cited

U.S. PATENT DOCUMENTS

| | | | | |
|---|---|---|---|---|
| 8,098,170 | B1* | 1/2012 | Szczerba | G02B 27/01 340/905 |
| 2009/0170434 | A1 | 7/2009 | Tengler et al. | |
| 2010/0253593 | A1* | 10/2010 | Seder | G01S 17/86 701/31.4 |
| 2013/0131918 | A1 | 5/2013 | Hahne | |
| 2015/0339593 | A1 | 11/2015 | Hakeem | |
| 2019/0079659 | A1* | 3/2019 | Adenwala | H04W 4/46 |
| 2019/0271767 | A1* | 9/2019 | Keilaf | G01S 17/931 |
| 2020/0232807 | A1 | 7/2020 | Mueller et al. | |
| 2021/0295746 | A1* | 9/2021 | Nishiyama | G09F 21/048 |

FOREIGN PATENT DOCUMENTS

| | | |
|---|---|---|
| DE | 10 2012 216 057 A1 | 5/2014 |
| DE | 10 2012 218 027 A1 | 6/2014 |
| DE | 10 2014 209 844 A1 | 11/2015 |
| DE | 10 2015 107 618 A1 | 11/2015 |
| DE | 10 2017 116 702 A1 | 1/2019 |

OTHER PUBLICATIONS

German-language Written Opinion (PCT/ISA/237) issued in PCT Application No. PCT/EP2021/073848 dated Nov. 25, 2021 (seven (7) pages).

German-language Search Report issued in German Application No. 10 2020 124 055.4 dated Aug. 26, 2021 with partial English translation (11 pages).

* cited by examiner

METHOD AND DEVICE FOR PROVIDING INFORMATION IN A VEHICLE

BACKGROUND AND SUMMARY OF THE INVENTION

The invention relates to a method and a corresponding device for providing information regarding the surroundings of a vehicle for an occupant or user of the vehicle.

An occupant of a vehicle, in particular an autonomously driving vehicle, can have a relatively large amount of time available during a trip that does not have to be spent driving the vehicle. The present document is concerned with the technical object of enabling an occupant of a vehicle to pass the available time on a trip in the vehicle as meaningfully and/or amusingly as possible.

The object is achieved by the claim invention. It is pointed out that additional features of a dependent patent claim dependent on an independent patent claim, without the features of the independent patent claim or only in combination with a subset of the features of the independent patent claim, can form an invention of their own that is independent of the combination of all features of the independent patent claim and can become the subject matter of an independent claim, a divisional application or a subsequent application. This applies in the same manner to technical teachings described in the description that can form an invention independent of the features of the independent patent claims.

According to one aspect, a device for providing information in a vehicle is described (the vehicle also being referred to as an "ego-vehicle" in the present document). The device can be designed to ascertain person-related data relating to an occupant of another vehicle in the surroundings of the vehicle and/or vehicle-related data relating to the other vehicle. The other vehicle can be detected e.g. on the basis of surroundings data from one or more surroundings sensors (in particular from one or more cameras) of the (ego-) vehicle. The device can be designed to receive the person-related and/or vehicle-related data from the other vehicle via a car-to-car communication link (in particular in response to a request for the data by the (ego-)vehicle).

The person-related data can comprise: information relating to a characteristic (e.g. age, nationality, etc.), relating to an occupation and/or relating to a qualification (e.g. a university degree) of the occupant of the other vehicle. Alternatively or additionally, the vehicle-related data can comprise: information relating to a characteristic and/or relating to a driving route of the other vehicle. The scope and/or the information depth of the person-related and/or vehicle-related data may have been defined by the occupant of the other vehicle. The person-related data can be provided by an electronic terminal of the occupant of the other vehicle.

The device is additionally designed to output the person-related and/or vehicle-related data to an occupant of the vehicle. The person-related and/or vehicle-related data here can be output in particular graphically (on a display screen of the vehicle or on a terminal of the occupant of the vehicle). Alternatively or additionally, the person-related and/or vehicle-related data can be output audibly and/or acoustically (e.g. via a loudspeaker of the vehicle and/or via headphones of an occupant of the vehicle).

In particular, the device can be designed to display the person-related and/or vehicle-related data in an information field that is overlaid with a graphical representation of the other vehicle, in particular a graphical representation of the surroundings situation in the surroundings of the vehicle (in which the other vehicle is also arranged).

For example, the device can be designed to output the information field on a window of the vehicle (e.g. as augmented reality) through which the occupant of the vehicle can see the other vehicle. Alternatively or additionally, the device can be designed to output, on the basis of image data from a camera of the vehicle, a graphical representation of the surroundings situation with the other vehicle on a display screen (a TFT display screen, for example) of the vehicle. The information field and can then be output within the graphical representation on the display screen.

The device thus makes it possible to ascertain person-related and/or vehicle-related data from one or more other road users and to provide the data to an occupant of the (ego-)vehicle. The comfort for the occupant of the (ego-) vehicle can thus be increased (especially on an autonomous trip).

The device can be designed to ascertain whether the occupant of the vehicle can see only the other vehicle or also the occupant of the other vehicle. The person-related data can optionally then be output to the occupant of the vehicle only if it is ascertained that the occupant of the vehicle can also see the occupant of the other vehicle. The information can thus be output in a targeted manner. The comfort for the occupant of the (ego-)vehicle can thus be further increased.

The device can be designed to provide, on the basis of the person-related and/or vehicle-related data, an interactive game, in particular a guessing or matching game, for the occupant of the vehicle. The comfort for the occupant of the (ego) vehicle can thus be further increased.

According to another aspect, a (road) motor vehicle (in particular a passenger car, a truck or a bus) is described that comprises the control unit and/or device described in this document.

According to a further aspect, a method for providing information in a vehicle is described. The method comprises ascertaining person-related data relating to an occupant of another vehicle in the surroundings of the vehicle and/or vehicle-related data with relating to the other vehicle. The method further comprises outputting the person-related and/or vehicle-related data to an occupant of the vehicle.

According to a further aspect, a software (SW) program is described. The SW program can be designed to be executed on a processor (e.g. on a control device of a vehicle) and to thereby carry out the method described in this document.

According to a further aspect, a storage medium is described. The storage medium can comprise an SW program that is designed to be executed on a processor and to thereby carry out the method described in this document.

It should be noted that the methods, devices and systems described in this document can be used both alone and in combination with other methods, devices and systems described in this document. Furthermore, all aspects of the methods, devices and systems described in this document can be combined with one another in multiple manners. In particular, the features of the claims can be combined with one another in multiple manners.

The invention will be described in detail below with reference to exemplary embodiments.

DETAILED DESCRIPTION OF THE DRAWINGS

Figure 1:
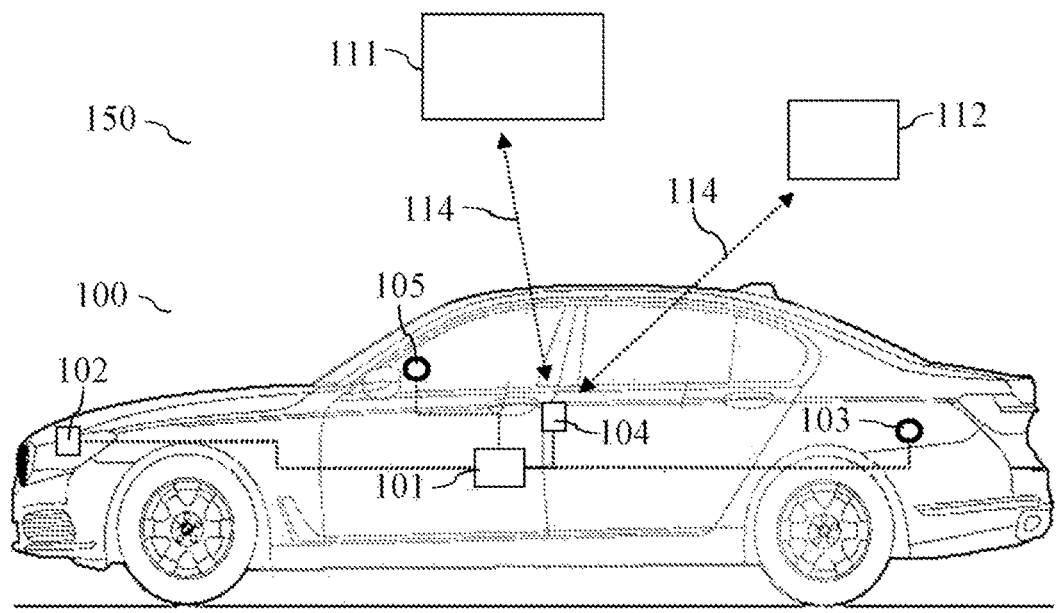
FIG. 1 shows examples of components of a vehicle.

As set forth above, the present document is concerned with providing information to a user of a vehicle, in particular an autonomously driving vehicle. In this regard, FIG. 1 shows an example system 150 having at least one (ego-) vehicle 100, having at least one other road user 112 (such as another vehicle) and optionally having a central processing unit 111 (e.g. a server external to the vehicle).

The vehicle 100 has a communication unit 104 which is designed to use a (wireless) communication link 114 (e.g. WLAN, 3G, 4G, 5G, etc.) to communicate with the central processing unit 111 and/or directly with one or more other road users, in particular other vehicles 112 (in order to interchange data).

The vehicle 100 comprises one or more surroundings sensors 102 (e.g. a video camera, a radar sensor, a lidar sensor, an ultrasound sensor, etc.) which are designed to capture sensor data relating to the surroundings of the vehicle 100. This sensor data is also referred to in the present document as surroundings data. A control unit 101 of the vehicle 100 is designed to detect, on the basis of the surroundings data, one or more objects, in particular one or more other road users (vehicles) 112, in the surroundings of the vehicle 100. In addition, the control unit 101 can be designed to operate, on the basis of the surroundings data, in particular on the basis of a surroundings model dependent on the surroundings data, one or more longitudinal and/or transverse guidance actuators 103 of the vehicle 100 (such as a steering unit, a drive unit and/or a brake system) in order to drive the vehicle 100 in an at least partially or completely automated manner.

The vehicle 100 further comprises a user interface 105 that is designed to interact with a user, in particular with an occupant and/or a driver, of the vehicle 100. The user interface 105 can be designed to accept inputs from the user such as a request for the output of information. The user interface 105 can further be designed to output information to the user (e.g. via a display screen of the user interface 105).

Figure 2A:
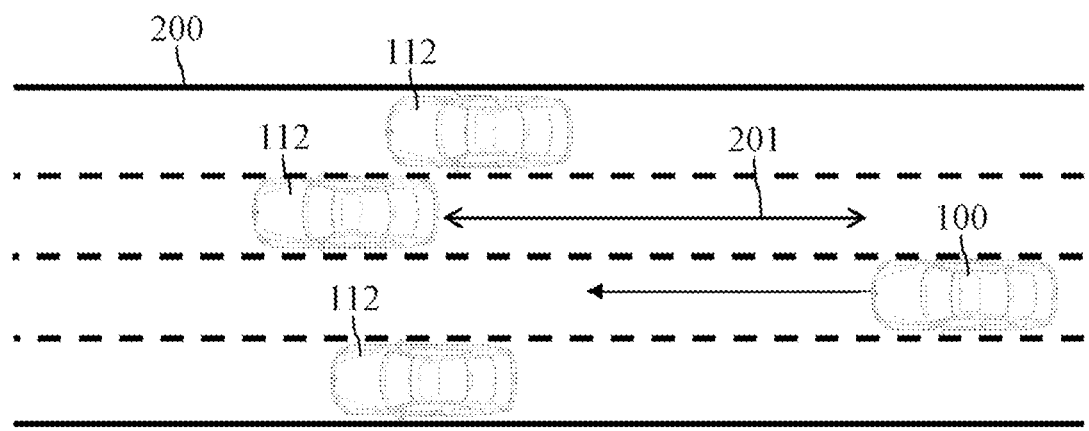
FIGS. 2a and 2b show examples of driving situations.
Figure 2B:
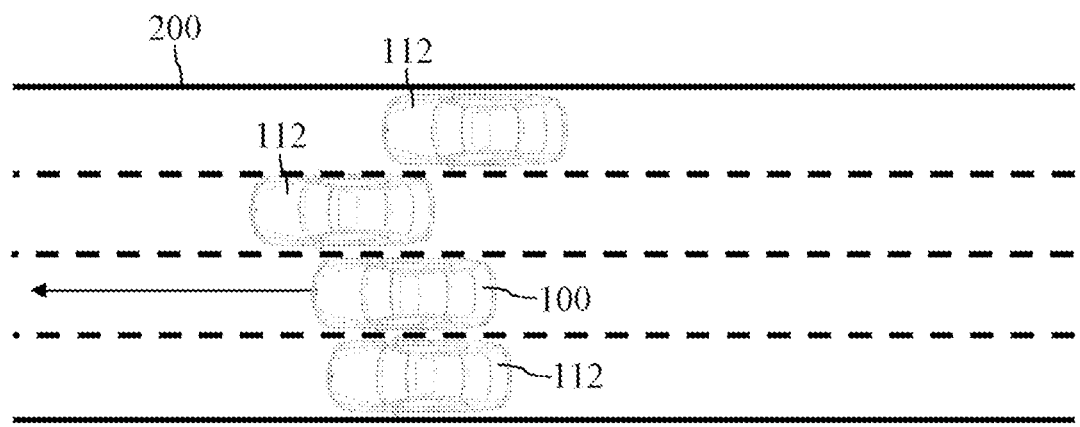

FIGS. 2a and 2b show example driving situations in which the (ego-)vehicle 110 is driving on a roadway 200 on which one or more other road users (in particular vehicles) 112 are also present. The control unit 101 can be designed to ascertain, on the basis of the surroundings data, distance information relating to the distance 201 between the vehicle 100 and another road user 112.

The control unit 101 can be designed to request, by way of the communication unit 104, person-related and/or vehicle-related data for another road user 112 in the surroundings of the vehicle 100. Examples of person-related and/or vehicle-related data are
  a destination of the other road user 112;
  a departure location of the other road user 112;
  a route already traveled by the other road user 112;
  a number of occupants in the other road user or vehicle 112; and/or
  personal information relating to an occupant of the other road user or vehicle 112.

The data relating to the other road user 112 can be requested by the user of the vehicle 100 by way of the user interface 105 of the vehicle 100. In response, the communication link 114 can then be used to transmit a request to the central processing unit 111 or directly to the other road user 112 (e.g. by way of car-to-X communication) and the requested information can be provided to the vehicle 100 via the communication link 114.

The control unit 101 can additionally be designed to output the person-related and/or vehicle-related data relating to the other road user 112 to the user of the vehicle 100 via the user interface 105. In particular, the data can be displayed on a display screen of the user interface 105.

Figure 3:
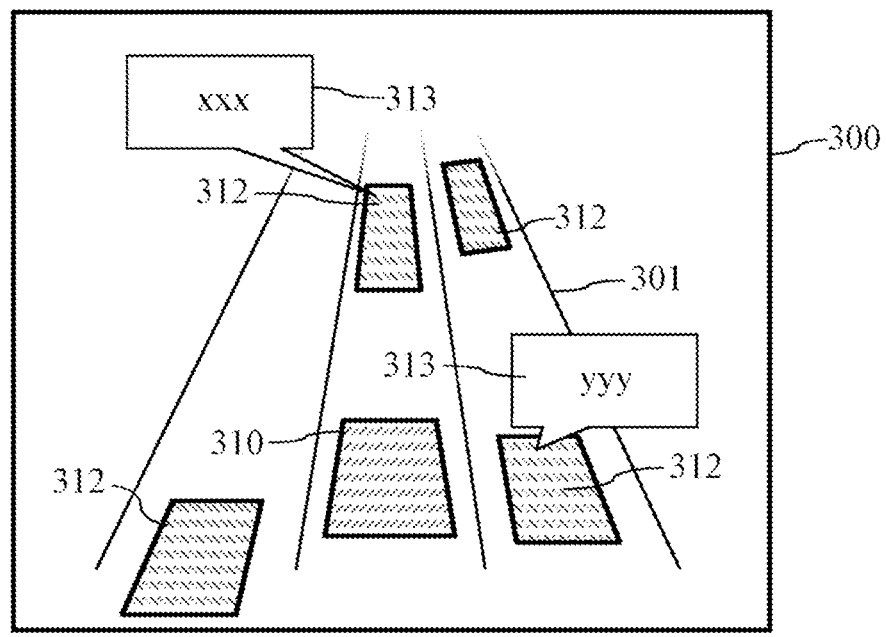
FIG. 3 shows an example of a graphical output on a display screen.

FIG. 3 shows an example of a graphical representation 300 which can be output on a display screen of the user interface 105. The roadway 301 traveled on by the vehicle 100 can be displayed in the graphical representation 300. Furthermore, the one or more other road users 312 can be displayed. Moreover, the ego-vehicle 310 can optionally be displayed. The graphical representation 300 can comprise a video playback of the surroundings of the vehicle 100. Alternatively, the graphical representation 300 can comprise a graphical representation of the current surroundings situation on the basis of graphical symbols 301, 310, 312.

The graphical representation 300 further comprises one or more information fields 313 for one or more other road users 112, 312. The information field 313 for another road user 112, 312 can be displayed in the direct vicinity of the road user 112 or the symbol 312 of the road user 112. The information field 313 for a road user 112 can comprise the person-related and/or vehicle-related data for the other road user 112, 312.

A situation can therefore be taken into account in which at least two vehicles 100, 112 drive past one another (e.g. in an overtaking maneuver, when passing on the freeway, etc.) and detect one another on the basis of the mutually approaching GPS coordinates which they interchange e.g. via car-to-car communication, or they detect one another by way of the sensor system 102 of their driver assistance systems. In this regard, the smartphones of the one or more occupants can serve as mobile computers, for example, which transmit person-related data (e.g. background, interests, etc.) to the respective vehicles 100, 112 (e.g. via Bluetooth). The person-related data can in turn be transmitted via car-to-car communication (e.g. WLAN) from one vehicle 112 to another vehicle 100. The person-related data can be anonymized hierarchically. It can be released in excerpted form, for example limited to certain classifications such as hobbies, interests, occupation, etc. The person-related data can be anonymized hierarchically (e.g. level 0: person anonymized; level 1: person partially anonymized; level 2: no anonymization and thus full profile with name, contact data, etc.).

An algorithm in the ego-vehicle 100 can be designed to access the person-related data of the one or more occupants of the one or more surrounding road users or vehicles 112. The ascertained data can be displayed on a display and/or a monitor or on a window of the vehicle 100 (e.g. by a projection) in such a way that a passing vehicle 112 receives an overlay 313 containing information (in particular if the occupant of the ego-vehicle 100 sees the other vehicle 112 through the window).

The information provided can depend on the anonymization level, for instance a) "a pilot is sitting in the other vehicle", b) "a pilot with airline X for a plane type Y is sitting in the other vehicle", c) "Mr. Müller, a pilot on his way to work with airline X for a plane type Y is sitting in the other vehicle". Furthermore, supplementary information can be output via a search function (e.g. from one or more databases from the Internet), for example regarding the occupational profile of a "pilot", regarding the airline X, regarding a specific airport or the plane type Y or other conceivable information relevant to the person.

Therefore a system 150 is described which uses communication technologies to provide additional information for the occupant of an ego-vehicle 100, in particular during autonomous driving, by data processing (databases from the Internet, person-related data of the occupants and/or vehicle-related data for one or more road users 112 in the surroundings of the vehicle 100). Alternatively or in addition to person-related data, vehicle-related data for the one or more road users 112 can be captured and/or transmitted.

Thus information relating to another vehicle 112 (such as vehicle age, power, total mileage and/or mileage per year, current daily mileage, departure location, etc.) can be shown on a display screen of the ego-vehicle 100 (e.g. in a projected display on a vehicle window or on a TFT display screen). For example "vehicle A departed from starting point Z1 at time T with destination Z2" can be displayed.

To be able to offer a pastime e.g. during an autonomously driven trip, matching and/or guessing games using the vehicle-related or person-related data of the one or more other road users 112 can optionally be implemented by the control unit 101. For a matching game for example, three vehicles in the surrounding road lanes can be circled by way of augmented reality in the vehicle window, with the question: "Which car has been on the freeway the longest today (in terms of travel time) or has driven the farthest (in terms of daily mileage)"? "Rank the vehicles in order of the distance traveled" or "Correctly match the occupations doctor, farmer, judge with the three displayed vehicles". For a guessing game the output could be for example: What is the occupation of the occupant of the vehicle in the lane to your right: "a) butcher, b) baker, c) politician"; or "Which car is now returning from a vacation?"

A user of the ego-vehicle 100 is therefore able to have additional information applied to a window of the ego-vehicle 100 when looking out through the window, such that the one or more other vehicles 112 in the surrounding traffic are marked (e.g. a colored box, a border, etc.) and thus the additional information can be superimposed. The actual external world can also be adopted from one or more onboard cameras 102 of the ego-vehicle 100 and presented on a monitor display in the vehicle 100.

The data can be displayed or visualized in various forms: in a head-up display, in a monitor such as a rear monitor or a panorama monitor; in a projection onto a window or onto the road; in a display on a mobile terminal device of the vehicle occupant, e.g. a smartphone or tablet.

The information relating to another road user 112 that is output in the ego-vehicle 100 depends on the distance 201 of the ego-vehicle 100 from the other road user 112. For example, if the occupant of the ego-vehicle 100 does not have visual contact with an occupant in the other vehicle 112, then primarily vehicle-related data can optionally be used or output (since the occupant of the ego-vehicle 100 cannot recognize the one or more occupants of the other vehicle 112). On the other hand, if the occupant of the ego-vehicle 100 has visual contact with an occupant in the other vehicle 112, then person-related and/or vehicle-related data can optionally be used and/or output.

As already set forth above, person-related data of an occupant of a vehicle 112 can be transmitted from an electronic terminal of the occupant to the vehicle 112 and/or to the central processing unit 111 (e.g. via Bluetooth or WLAN). Vehicle-related data can also be transmitted to the central processing unit 111. The person-related and/or vehicle-related data can be transmitted via car-to-car communication from the other vehicle 112 and/or from the central processing unit 111 to the ego-vehicle 100. An occupant of the ego-vehicle 100 can then view the person-related and/or vehicle-related data in an information overview together with additional background information.

Figure 4:
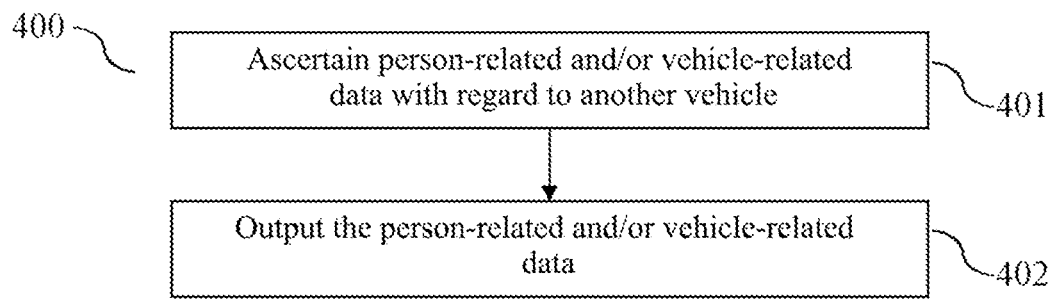
FIG. 4 shows a flowchart for an example of a method for providing information to a vehicle user.

FIG. 4 shows a flowchart for an example of a (computer-implemented) method 400 for providing information in a vehicle 100.

The method 400 comprises ascertaining 401 person-related data relating to an occupant of another vehicle 112 in the surroundings of the vehicle 100 and/or vehicle-related data relating to the other vehicle 112. The scope of the person-related and/or vehicle-related data provided by the other vehicle 112 may have been defined by the occupant of the other vehicle 112.

The method 400 further comprises outputting 402 the person-related and/or vehicle-related data to an occupant of the vehicle 100 (e.g. as part of a guessing and/or matching game). The comfort for the occupant of the vehicle 100 can thus be increased, especially on an autonomous trip.

The present invention is not limited to the exemplary embodiments shown. It should be noted in particular that the description and the figures are only intended to illustrate the principle of the proposed methods, devices and systems by way of example.

The invention claimed is:

1. A device for providing information in a vehicle, wherein the device is configured to:
   ascertain person-related data relating to an occupant of another vehicle in surroundings of the vehicle and/or vehicle-related data relating to the other vehicle;
   output the person-related data and/or the vehicle-related data to an occupant of the vehicle;
   display the person-related data and/or the vehicle-related data in an information field that is overlaid with a graphical representation of the other vehicle;
   output the information field on a window of the vehicle through which the occupant of the vehicle can see the other vehicle; and
   provide, based on the person-related data and/or the vehicle-related data, an interactive game for the occupant of the vehicle on the window of the vehicle through which the occupant of the vehicle can see the other vehicle.

2. The device according to claim 1, wherein the person-related data comprises information relating to a characteristic, relating to an occupation and/or relating to a qualification of the occupant of the other vehicle.

3. The device according to claim 1, wherein the vehicle-related data comprises information relating to a characteristic and/or relating to a driving route of the other vehicle.

4. The device according to claim 1, wherein the device is further configured to receive the person-related data and/or the vehicle-related data from the other vehicle via a car-to-car communication link.

5. The device according to claim 1, wherein the device is further configured to:
   output, based on image data from a camera of the vehicle, a graphical representation of a surroundings situation with the other vehicle on a display screen of the vehicle; and
   output the information field within the graphical representation on the display screen.

6. The device according to claim 1, wherein the device is further configured to:

output, based on image data from a camera of the vehicle, a graphical representation of a surroundings situation with the other vehicle on a display screen of the vehicle; and output the information field within the graphical representation on the display screen.

7. The device according to claim 1, wherein the device is further configured to:

ascertain whether the occupant of the vehicle can see only the other vehicle or also the occupant of the other vehicle; and output the person-related data to the occupant of the vehicle only upon ascertaining that the occupant of the vehicle can also see the occupant of the other vehicle.

8. The device according to claim 1, wherein the interactive game is a guessing or matching game.

9. A method for providing information in a vehicle, the method comprising:

ascertaining person-related data relating to an occupant of another vehicle in surroundings of the vehicle and/or vehicle-related data relating to the other vehicle;

outputting the person-related data and/or the vehicle-related data to an occupant of the vehicle;

displaying the person-related data and/or the vehicle-related data in an information field that is overlaid with a graphical representation of the other vehicle;

outputting the information field on a window of the vehicle through which the occupant of the vehicle can see the other vehicle; and providing, based on the person-related data and/or the vehicle-related data, an interactive game for the occupant of the vehicle on the window of the vehicle through which the occupant of the vehicle can see the other vehicle.

* * * * *